(12) United States Patent
Lin et al.

(10) Patent No.: US 8,724,895 B2
(45) Date of Patent: May 13, 2014

(54) TECHNIQUES FOR REDUCING COLOR ARTIFACTS IN DIGITAL IMAGES

(75) Inventors: Shang-Hung Lin, San Jose, CA (US); Ignatius Tjandrasuwita, Atherton, CA (US)

(73) Assignee: Nvidia Corporation, Santa Clara, CA (US)

( * ) Notice: Subject to any disclaimer, the term of this patent is extended or adjusted under 35 U.S.C. 154(b) by 942 days.

(21) Appl. No.: 11/781,766

(22) Filed: Jul. 23, 2007

(65) Prior Publication Data

US 2009/0027525 A1    Jan. 29, 2009

(51) Int. Cl.
- G06K 9/00 (2006.01)
- G06K 9/40 (2006.01)
- G06K 9/32 (2006.01)
- H04N 3/14 (2006.01)

(52) U.S. Cl.
USPC ............ 382/167; 382/275; 382/300; 348/272

(58) Field of Classification Search
USPC .......................... 382/167, 275, 300; 348/272
See application file for complete search history.

(56) References Cited

U.S. PATENT DOCUMENTS

| | | |
|---|---|---|
| 3,904,818 A | 9/1975 | Kovac |
| 4,253,120 A | 2/1981 | Levine |
| 4,646,251 A | 2/1987 | Hayes et al. |
| 4,682,664 A | 7/1987 | Kemp |
| 4,685,071 A | 8/1987 | Lee |
| 4,739,495 A | 4/1988 | Levine |
| 4,771,470 A | 9/1988 | Geiser et al. |
| 4,803,477 A | 2/1989 | Miyatake et al. |
| 4,920,428 A | 4/1990 | Lin et al. |
| 4,987,496 A | 1/1991 | Greivenkamp, Jr. |
| 5,175,430 A | 12/1992 | Enke et al. |
| 5,227,789 A | 7/1993 | Barry et al. |
| 5,261,029 A | 11/1993 | Abi-Ezzi et al. |
| 5,305,994 A | 4/1994 | Matsui et al. |
| 5,338,901 A | 8/1994 | Dietrich |
| 5,387,983 A | 2/1995 | Sugiura et al. |
| 5,414,824 A | 5/1995 | Grochowski |
| 5,475,430 A | 12/1995 | Hamada et al. |
| 5,513,016 A | 4/1996 | Inoue |

(Continued)

FOREIGN PATENT DOCUMENTS

| | | |
|---|---|---|
| CN | 1275870 A | 12/2000 |
| EP | 0392565 | 10/1990 |

(Continued)

OTHER PUBLICATIONS

Kuno et al. "New Interpolation Method Using Discriminated Color Correlation for Digital Still Cameras" IEEE Transac. on Consumer Electronics, vol. 45, No. 1, Feb. 1999, pp. 259-267.*

(Continued)

Primary Examiner — Utpal Shah

(57) ABSTRACT

A technique for reducing artifacts in a digital image, in accordance with one embodiment, includes receiving a stream of raw filter pixel data representing the image. The raw filter pixel data is interpolating to produce red, green-on-red row, green-on-blue row and blue pixel data for each pixel. An artifact in one or more given pixels is reduced as a function of a difference between the green-on-red row and green-on-blue row pixel data of each of the given pixels to generate adjusted interpolated pixel data.

19 Claims, 8 Drawing Sheets

(56) References Cited

U.S. PATENT DOCUMENTS

| | | | |
|---|---|---|---|
| 5,608,824 A | 3/1997 | Shimizu et al. | |
| 5,652,621 A * | 7/1997 | Adams et al. | 348/272 |
| 5,736,987 A | 4/1998 | Drucker et al. | |
| 5,793,371 A | 8/1998 | Deering | |
| 5,793,433 A | 8/1998 | Kim et al. | |
| 5,822,452 A | 10/1998 | Tarolli et al. | |
| 5,831,625 A | 11/1998 | Rich et al. | |
| 5,831,640 A | 11/1998 | Wang et al. | |
| 5,835,097 A | 11/1998 | Vaswani et al. | |
| 5,841,442 A | 11/1998 | Einkauf et al. | |
| 5,878,174 A | 3/1999 | Stewart et al. | |
| 5,892,517 A | 4/1999 | Rich | |
| 5,903,273 A | 5/1999 | Mochizuki et al. | |
| 5,905,530 A | 5/1999 | Yokota et al. | |
| 5,963,984 A | 10/1999 | Garibay, Jr. et al. | |
| 5,995,109 A | 11/1999 | Goel et al. | |
| 6,016,474 A | 1/2000 | Kim et al. | |
| 6,052,127 A | 4/2000 | Vaswani et al. | |
| 6,078,331 A | 6/2000 | Pulli et al. | |
| 6,078,334 A | 6/2000 | Hanaoka et al. | |
| 6,111,988 A | 8/2000 | Horowitz et al. | |
| 6,118,547 A | 9/2000 | Tanioka | |
| 6,128,000 A | 10/2000 | Jouppi et al. | |
| 6,141,740 A | 10/2000 | Mahalingaiah et al. | |
| 6,151,457 A | 11/2000 | Kawamoto | |
| 6,175,430 B1 | 1/2001 | Ito | |
| 6,184,893 B1 | 2/2001 | Devic et al. | |
| 6,236,405 B1 | 5/2001 | Schilling et al. | |
| 6,252,611 B1 | 6/2001 | Kondo | |
| 6,256,038 B1 | 7/2001 | Krishnamurthy | |
| 6,281,931 B1 | 8/2001 | Tsao et al. | |
| 6,289,103 B1 | 9/2001 | Sako et al. | |
| 6,298,169 B1 | 10/2001 | Guenter | |
| 6,314,493 B1 | 11/2001 | Luick | |
| 6,319,682 B1 | 11/2001 | Hochman | |
| 6,323,934 B1 | 11/2001 | Enomoto | |
| 6,339,428 B1 | 1/2002 | Fowler et al. | |
| 6,392,216 B1 | 5/2002 | Peng-Tan | |
| 6,396,397 B1 | 5/2002 | Bos et al. | |
| 6,438,664 B1 | 8/2002 | McGrath et al. | |
| 6,469,707 B1 | 10/2002 | Voorhies | |
| 6,486,971 B1 | 11/2002 | Kawamoto | |
| 6,504,952 B1 | 1/2003 | Takemura et al. | |
| 6,549,997 B2 | 4/2003 | Kalyanasundharam | |
| 6,556,311 B1 | 4/2003 | Benear et al. | |
| 6,584,202 B1 | 6/2003 | Montag et al. | |
| 6,594,388 B1 | 7/2003 | Gindele et al. | |
| 6,683,643 B1 | 1/2004 | Takayama et al. | |
| 6,707,452 B1 | 3/2004 | Veach | |
| 6,724,423 B1 | 4/2004 | Sudo | |
| 6,724,932 B1 * | 4/2004 | Ito | 382/162 |
| 6,737,625 B2 | 5/2004 | Baharav et al. | |
| 6,760,080 B1 | 7/2004 | Moddel et al. | |
| 6,785,814 B1 | 8/2004 | Usami et al. | |
| 6,806,452 B2 | 10/2004 | Bos et al. | |
| 6,819,793 B1 | 11/2004 | Reshetov et al. | |
| 6,839,062 B2 | 1/2005 | Aronson et al. | |
| 6,839,813 B2 | 1/2005 | Chauvel | |
| 6,856,441 B2 | 2/2005 | Zhang et al. | |
| 6,859,208 B1 | 2/2005 | White | |
| 6,876,362 B1 | 4/2005 | Newhall, Jr. et al. | |
| 6,883,079 B1 | 4/2005 | Priborsky | |
| 6,891,543 B2 | 5/2005 | Wyatt | |
| 6,900,836 B2 | 5/2005 | Hamilton, Jr. | |
| 6,940,511 B2 | 9/2005 | Akenine-Moller et al. | |
| 6,950,099 B2 | 9/2005 | Stollnitz et al. | |
| 7,009,639 B1 * | 3/2006 | Une et al. | 348/223.1 |
| 7,015,909 B1 | 3/2006 | Morgan, III et al. | |
| 7,023,479 B2 | 4/2006 | Hiramatsu et al. | |
| 7,081,898 B2 | 7/2006 | Sevigny | |
| 7,082,508 B2 | 7/2006 | Khan et al. | |
| 7,088,388 B2 | 8/2006 | MacLean et al. | |
| 7,092,018 B1 | 8/2006 | Watanabe | |
| 7,106,368 B2 | 9/2006 | Daiku et al. | |
| 7,107,441 B2 | 9/2006 | Zimmer et al. | |
| 7,116,335 B2 | 10/2006 | Pearce et al. | |
| 7,120,715 B2 | 10/2006 | Chauvel et al. | |
| 7,133,041 B2 | 11/2006 | Kaufman et al. | |
| 7,133,072 B2 | 11/2006 | Harada | |
| 7,146,041 B2 | 12/2006 | Takahashi | |
| 7,221,779 B2 | 5/2007 | Kawakami et al. | |
| 7,227,586 B2 | 6/2007 | Finlayson et al. | |
| 7,236,649 B2 | 6/2007 | Fenney | |
| 7,245,319 B1 | 7/2007 | Enomoto | |
| 7,305,148 B2 * | 12/2007 | Spampinato et al. | 382/299 |
| 7,343,040 B2 | 3/2008 | Chanas et al. | |
| 7,397,946 B2 | 7/2008 | Reshetov et al. | |
| 7,447,869 B2 | 11/2008 | Kruger et al. | |
| 7,486,844 B2 * | 2/2009 | Chang et al. | 382/300 |
| 7,502,505 B2 * | 3/2009 | Malvar et al. | 382/162 |
| 7,519,781 B1 | 4/2009 | Wilt | |
| 7,545,382 B1 | 6/2009 | Montrym et al. | |
| 7,580,070 B2 | 8/2009 | Yanof et al. | |
| 7,626,612 B2 | 12/2009 | John et al. | |
| 7,627,193 B2 | 12/2009 | Alon et al. | |
| 7,671,910 B2 * | 3/2010 | Lee | 348/272 |
| 7,728,880 B2 | 6/2010 | Hung et al. | |
| 7,750,956 B2 | 7/2010 | Wloka | |
| 7,760,936 B1 | 7/2010 | King et al. | |
| 7,817,187 B2 | 10/2010 | Silsby et al. | |
| 7,859,568 B2 | 12/2010 | Shimano et al. | |
| 7,860,382 B2 | 12/2010 | Grip | |
| 7,912,279 B2 | 3/2011 | Hsu et al. | |
| 8,049,789 B2 | 11/2011 | Innocent | |
| 8,238,695 B1 | 8/2012 | Davey et al. | |
| 8,456,547 B2 | 6/2013 | Wloka | |
| 8,456,548 B2 | 6/2013 | Wloka | |
| 8,456,549 B2 | 6/2013 | Wloka | |
| 8,471,852 B1 | 6/2013 | Bunnell | |
| 2001/0001234 A1 | 5/2001 | Addy et al. | |
| 2001/0012113 A1 | 8/2001 | Yoshizawa et al. | |
| 2001/0012127 A1 | 8/2001 | Fukuda et al. | |
| 2001/0015821 A1 | 8/2001 | Namizuka et al. | |
| 2001/0019429 A1 | 9/2001 | Oteki et al. | |
| 2001/0021278 A1 | 9/2001 | Fukuda et al. | |
| 2001/0033410 A1 | 10/2001 | Helsel et al. | |
| 2001/0050778 A1 | 12/2001 | Fukuda et al. | |
| 2001/0054126 A1 | 12/2001 | Fukuda et al. | |
| 2002/0012131 A1 | 1/2002 | Oteki et al. | |
| 2002/0015111 A1 | 2/2002 | Harada | |
| 2002/0018244 A1 | 2/2002 | Namizuka et al. | |
| 2002/0027670 A1 | 3/2002 | Takahashi et al. | |
| 2002/0033887 A1 | 3/2002 | Hieda et al. | |
| 2002/0041383 A1 | 4/2002 | Lewis, Jr. et al. | |
| 2002/0044778 A1 * | 4/2002 | Suzuki | 396/429 |
| 2002/0054374 A1 | 5/2002 | Inoue et al. | |
| 2002/0063802 A1 | 5/2002 | Gullichsen et al. | |
| 2002/0105579 A1 | 8/2002 | Levine et al. | |
| 2002/0126210 A1 | 9/2002 | Shinohara et al. | |
| 2002/0146136 A1 | 10/2002 | Carter, Jr. | |
| 2002/0149683 A1 | 10/2002 | Post | |
| 2002/0158971 A1 | 10/2002 | Daiku et al. | |
| 2002/0167202 A1 | 11/2002 | Pfalzgraf | |
| 2002/0167602 A1 * | 11/2002 | Nguyen | 348/280 |
| 2002/0169938 A1 | 11/2002 | Scott et al. | |
| 2002/0172199 A1 | 11/2002 | Scott et al. | |
| 2002/0191694 A1 | 12/2002 | Ohyama et al. | |
| 2002/0196470 A1 | 12/2002 | Kawamoto et al. | |
| 2003/0035100 A1 | 2/2003 | Dimsdale et al. | |
| 2003/0067461 A1 | 4/2003 | Fletcher et al. | |
| 2003/0122825 A1 | 7/2003 | Kawamoto | |
| 2003/0142222 A1 | 7/2003 | Hordley | |
| 2003/0146975 A1 | 8/2003 | Joung et al. | |
| 2003/0167420 A1 | 9/2003 | Parsons | |
| 2003/0169353 A1 | 9/2003 | Keshet et al. | |
| 2003/0169918 A1 | 9/2003 | Sogawa | |
| 2003/0197701 A1 | 10/2003 | Teodosiadis et al. | |
| 2003/0218672 A1 | 11/2003 | Zhang et al. | |
| 2003/0222995 A1 | 12/2003 | Kaplinsky et al. | |
| 2003/0223007 A1 | 12/2003 | Takane | |
| 2004/0001061 A1 | 1/2004 | Stollnitz et al. | |
| 2004/0001234 A1 | 1/2004 | Curry et al. | |
| 2004/0032516 A1 | 2/2004 | Kakarala | |
| 2004/0051716 A1 | 3/2004 | Sevigny | |

(56) References Cited

U.S. PATENT DOCUMENTS

| | | |
|---|---|---|
| 2004/0066970 A1 | 4/2004 | Matsugu |
| 2004/0100588 A1 | 5/2004 | Hartson et al. |
| 2004/0101313 A1 | 5/2004 | Akiyama |
| 2004/0109069 A1 | 6/2004 | Kaplinsky et al. |
| 2004/0151372 A1 | 8/2004 | Reshetov et al. |
| 2004/0189875 A1 | 9/2004 | Zhai et al. |
| 2004/0207631 A1 | 10/2004 | Fenney et al. |
| 2004/0218071 A1 | 11/2004 | Chauville et al. |
| 2004/0247196 A1 | 12/2004 | Chanas et al. |
| 2005/0007378 A1 | 1/2005 | Grove |
| 2005/0007477 A1 | 1/2005 | Ahiska |
| 2005/0030395 A1 | 2/2005 | Hattori |
| 2005/0046704 A1 | 3/2005 | Kinoshita |
| 2005/0073591 A1 | 4/2005 | Ishiga et al. |
| 2005/0099418 A1 | 5/2005 | Cabral et al. |
| 2005/0110790 A1 | 5/2005 | D'Amora |
| 2005/0111110 A1 | 5/2005 | Matama |
| 2005/0175257 A1 | 8/2005 | Kuroki |
| 2005/0185058 A1 | 8/2005 | Sablak |
| 2005/0238225 A1 | 10/2005 | Jo et al. |
| 2005/0243181 A1 | 11/2005 | Castello et al. |
| 2005/0248671 A1 | 11/2005 | Schweng |
| 2005/0261849 A1 | 11/2005 | Kochi et al. |
| 2005/0268067 A1 | 12/2005 | Lee et al. |
| 2005/0286097 A1 | 12/2005 | Hung et al. |
| 2006/0004984 A1 | 1/2006 | Morris et al. |
| 2006/0050158 A1 | 3/2006 | Irie |
| 2006/0061658 A1 | 3/2006 | Faulkner et al. |
| 2006/0087509 A1 | 4/2006 | Ebert et al. |
| 2006/0119710 A1 | 6/2006 | Ben-Ezra et al. |
| 2006/0133697 A1 | 6/2006 | Uvarov et al. |
| 2006/0153441 A1 | 7/2006 | Li |
| 2006/0176375 A1* | 8/2006 | Hwang et al. ............... 348/222.1 |
| 2006/0197664 A1 | 9/2006 | Zhang et al. |
| 2006/0259732 A1 | 11/2006 | Traut et al. |
| 2006/0259825 A1 | 11/2006 | Cruickshank et al. |
| 2006/0274171 A1 | 12/2006 | Wang |
| 2006/0290794 A1 | 12/2006 | Bergman et al. |
| 2006/0293089 A1 | 12/2006 | Herberger et al. |
| 2007/0073996 A1 | 3/2007 | Kruger et al. |
| 2007/0091188 A1 | 4/2007 | Chen et al. |
| 2007/0106874 A1 | 5/2007 | Pan et al. |
| 2007/0126756 A1 | 6/2007 | Glasco et al. |
| 2007/0147706 A1 | 6/2007 | Sasaki et al. |
| 2007/0157001 A1 | 7/2007 | Ritzau |
| 2007/0168634 A1 | 7/2007 | Morishita et al. |
| 2007/0168643 A1 | 7/2007 | Hummel et al. |
| 2007/0171288 A1 | 7/2007 | Inoue et al. |
| 2007/0236770 A1 | 10/2007 | Doherty et al. |
| 2007/0247532 A1* | 10/2007 | Sasaki ....................... 348/231.99 |
| 2007/0262985 A1 | 11/2007 | Watanabe et al. |
| 2007/0285530 A1 | 12/2007 | Kim et al. |
| 2008/0030587 A1 | 2/2008 | Helbing |
| 2008/0043024 A1 | 2/2008 | Schiwietz et al. |
| 2008/0062164 A1 | 3/2008 | Bassi et al. |
| 2008/0101690 A1 | 5/2008 | Hsu et al. |
| 2008/0143844 A1 | 6/2008 | Innocent |
| 2008/0231726 A1 | 9/2008 | John |
| 2008/0263284 A1 | 10/2008 | da Silva et al. |
| 2009/0002517 A1 | 1/2009 | Yokomitsu et al. |
| 2009/0010539 A1* | 1/2009 | Guarnera et al. ............ 382/167 |
| 2009/0037774 A1 | 2/2009 | Rideout et al. |
| 2009/0041341 A1 | 2/2009 | Scheibe |
| 2009/0116750 A1* | 5/2009 | Lee et al. ................... 382/199 |
| 2009/0128575 A1 | 5/2009 | Liao et al. |
| 2009/0160957 A1 | 6/2009 | Deng et al. |
| 2009/0257677 A1 | 10/2009 | Cabral et al. |
| 2009/0297022 A1 | 12/2009 | Pettigrew et al. |
| 2010/0266201 A1 | 10/2010 | Cabral et al. |

FOREIGN PATENT DOCUMENTS

| | | |
|---|---|---|
| EP | 1449169 | 5/2003 |
| EP | 1378790 | 7/2004 |
| EP | 1447977 | 8/2004 |
| EP | 1550980 | 7/2005 |
| GB | 2045026 | 10/1980 |
| GB | 2363018 | 12/2001 |
| JP | 61187467 | 8/1986 |
| JP | 62-151978 | 7/1987 |
| JP | 07-015631 | 1/1995 |
| JP | 08-079622 | 4/1995 |
| JP | 8036640 | 2/1996 |
| JP | 09233353 | 9/1997 |
| JP | 2000516752 | 12/2000 |
| JP | 2001-052194 | 2/2001 |
| JP | 2002-207242 | 10/2001 |
| JP | 2003-085542 | 3/2003 |
| JP | 2004-221838 A | 5/2004 |
| JP | 2005094048 | 4/2005 |
| JP | 2005-182785 | 7/2005 |
| JP | 2005520442 | 7/2005 |
| JP | 2006-094494 | 9/2005 |
| JP | 2007-148500 | 11/2005 |
| JP | 2006025005 | 1/2006 |
| JP | 2007-233833 | 3/2006 |
| JP | 2006086822 | 3/2006 |
| JP | 2006-121612 | 5/2006 |
| JP | 2006-134157 | 5/2006 |
| JP | 20060203841 | 8/2006 |
| JP | 2007019959 | 1/2007 |
| JP | 2007282158 | 10/2007 |
| JP | 2008-085388 | 4/2008 |
| JP | 2008113416 | 5/2008 |
| JP | 2008-277926 | 11/2008 |
| JP | 2009021962 | 1/2009 |
| KR | 1020040043156 | 5/2004 |
| KR | 1020060068497 | 6/2006 |
| KR | 1020070004202 | 1/2007 |
| WO | 03043308 | 5/2003 |
| WO | 2004063989 | 7/2004 |
| WO | 2007056459 | 5/2007 |
| WO | 2007093864 | 8/2007 |

OTHER PUBLICATIONS

"Method of Color Interpolation in a Single Sensor Color Camera Using Green Channel Separation" Weerasighe, et al Visual Information Processing Lab, Motorola Australian Research Center pp. IV-3233-IV3236' 2002.

D. Doo, M. Sabin, "behaviour of recursive division surfaces near extraordinary points"; Sep. 1978; Computer Aided Design; vol. 10, pp. 356-360.

D. W. H. Doo; "A subdivision algorithm for smoothing down irregular shaped polyhedrons"; 1978; Interactive Techniques in Computer Aided Design; pp. 157-165.

Davis, J., Marschner, S., Garr, M., Levoy, M., Filling holes in complex surfaces using volumetric diffusion, Dec. 2001, Stanford University, pp. 1-9.

E. Catmull, J.Clark, "recursively generated B-Spline surfaces on arbitrary topological meshes"; Nov. 1978; Computer aided design; vol. 10; pp. 350-355.

J. Bolz, P. Schroder; "rapid evaluation of catmull-clark subdivision surfaces"; Web 3D '02.

J. Stam; "Exact Evaluation of Catmull-clark subdivision surfaces at arbitrary parameter values"; Jul. 1998; Computer Graphics; vol. 32; pp. 395-404.

Krus, M., Bourdot, P., Osorio, A., Guisnel, F., Thibault, G., Adaptive tessellation of connected primitives for interactive walkthroughs in complex industrial virtual environments, Jun. 1999, Proceedings of the Eurographics workshop, pp. 1-10.

Kumar, S., Manocha, D., Interactive display of large scale trimmed NURBS models, 1994, University of North Carolina at Chapel Hill, Technical Report, pp. 1-36.

Loop, C., DeRose, T., Generalized B-Spline surfaces of arbitrary topology, Aug. 1990, SIGRAPH 90, pp. 347-356.

M. Halstead, M. Kass, T. DeRose; "efficient, fair interpolation using catmull-clark surfaces"; Sep. 1993; Computer Graphics and Interactive Techniques, Proc; p. 35-44.

(56) References Cited

OTHER PUBLICATIONS

T. DeRose, M. Kass, T. Truong; "subdivision surfaces in character animation"; Jul. 1998; Computer Graphics and Interactive Techniques, Proc; pp. 85-94.

Takeuchi, S., Kanai, T., Suzuki, H., Shimada, K., Kimura, F., Subdivision surface fitting with QEM-based mesh simplification and reconstruction of approximated B-spline surfaces, 2000, Eighth Pacific Conference on computer graphics and applications, pp. 202-212.

http://Slashdot.org/articles/07/09/06/1431217.html.

http://englishrussia.com/?p=1377.

"A Pipelined Architecture for Real-Time Correction of Barrel Distortion in Wide-Angle Camera Images", Hau T. Ngo, Student Member, IEEE and Vijayan K. Asari, Senior Member IEEE, IEEE Transaction on Circuits and Systems for Video Technology: vol. 15 No. 3 Mar. 2005 pp. 436-444.

"Calibration and removal of lateral chromatic aberration in images" Mallon, et al. Science Direct Copyright 2006; 11 pages.

Donald D. Spencer, "Illustrated Computer Graphics Dictionary", 1993, Camelot Publishing Company, p. 272.

Duca et al., "A Relational Debugging Engine for Graphics Pipeline, International Conference on Computer Graphics and Interactive Techniques", ACM SIGGRAPH Jul. 2005, pp. 453-463.

gDEBugger, graphicRemedy, http://www.gremedy.com, Aug. 8, 2006, pp. 1-18.

Keith R. Slavin; Application as Filed entitled "Efficient Method for Reducing Noise and Blur in a Composite Still Image From a Rolling Shutter Camera"; U.S. Appl. No. 12/069,669, filed Feb. 11, 2008.

Ko et al., "Fast Digital Image Stabilizer Based on Gray-Coded Bit-Plane Matching", IEEE Transactions on Consumer Electronics, vol. 45, No. 3, pp. 598-603, Aug. 1999.

Ko, et al., "Digital Image Stabilizing Algorithms Basd on Bit-Plane Matching", IEEE Transactions on Consumer Electronics, vol. 44, No. 3, pp. 617-622, Aug. 1988.

Morimoto et al., "Fast Electronic Digital Image Stabilization for Off-Road Navigation", Computer Vision Laboratory, Center for Automated Research University of Maryland, Real-Time Imaging, vol. 2, pp. 285-296, 1996.

Paik et al., "An Adaptive Motion Decision system for Digital Image Stabilizer Based on Edge Pattern Matching", IEEE Transactions on Consumer Electronics, vol. 38, No. 3, pp. 607-616, Aug. 1992.

Parhami, Computer Arithmetic, Oxford University Press, Jun. 2000, pp. 413-418.

S. Erturk, "Digital Image Stabilization with Sub-Image Phase Correlation Based Global Motion Estimation", IEEE Transactions on Consumer Electronics, vol. 49, No. 4, pp. 1320-1325, Nov. 2003.

S. Erturk, "Real-Time Digital Image Stabilization Using Kalman Filters", http://www,ideallibrary.com, Real-Time Imaging 8, pp. 317-328, 2002.

Uomori et al., "Automatic Image Stabilizing System by Full-Digital Signal Processing", vol. 36, No. 3, pp. 510-519, Aug. 1990.

Uomori et al., "Electronic Image Stabiliztion System for Video Cameras and VCRS", J. Soc. Motion Pict. Telev. Eng., vol. 101, pp. 66-75, 1992.

http://en.wikipedia.org/wiki/Bayer_filter; "Bayer Filter"; Wikipedia, the free encyclopedia; pp. 1-4, 2010.

http://en.wikipedia.org/wiki/Color_filter_array; "Color Filter Array"; Wikipedia, the free encyclopedia; pp. 1-5, 2010.

http://en.wikipedia.org/wiki/Color_space; "Color Space"; Wikipedia, the free encyclopedia; pp. 1-4, 2010.

http://en.wikipedia.org/wiki/Color_translation; "Color Management"; Wikipedia, the free encyclopedia; pp. 1-4, 2010.

http://en.wikipedia.org/wiki/Demosaicing; "Demosaicing"; Wikipedia, the free encyclopedia; pp. 1-5, 2010.

http://en.wikipedia.org/wiki/Half_tone; "Halftone"; Wikipedia, the free encyclopedia; pp. 1-5, 2010.

http://en.wikipedia.org/wiki/L*a*b*; "Lab Color Space"; Wikipedia, the free encyclopedia; pp. 1-42, 2010.

Weerasinghe et al.; "Method of Color Interpolation in a Single Sensor Color Camera Using Green Channel Separation"; Visual Information Proessing lab, Motorola Australian Research Center; IV 3233-IV3236, 2002.

Chaudhuri, "The impact of NACKs in shared memory scientific applications", Feb. 2004, IEEE, IEEE Transactions on Parallel and distributed systems vol. 15, No. 2, p. 134-150.

Laibinis, "Formal Development of Reactive Fault Tolerant Systems", Sep. 9, 2005, Springer, Second International Workshop, Rise 2005, p. 234-249.

Wikipedia, Memory Address, Oct. 29, 2010, pp. 1-4, www.wikipedia.com.

Wikipedia, Physical Address, Apr. 17, 2010, pp. 1-2, www.wikipedia.com.

Goshtasby, Ardeshir, "Correction of Image Distortion From Lens Distortion Using Bezier Patches", 1989, Computer Vision, Graphics and Image Processing, vol. 47, pp. 358-394.

\* cited by examiner

TECHNIQUES FOR REDUCING COLOR ARTIFACTS IN DIGITAL IMAGES

BACKGROUND OF THE INVENTION

Computing devices have made significant contributions toward the advancement of modern society and are utilized in a number of applications to achieve advantageous results. Numerous devices, such as digital cameras, computers, game consoles, video equipment, hand-held computing devices, audio devices, and telephones, have facilitated increased productivity and reduced costs in communicating and analyzing data in most areas of entertainment, education, business and science. The digital camera, for example, has become popular for personal use and for use in business.

FIG. 1 shows an exemplary digital camera. The digital camera 100 typically includes one or more lenses 110, one or more filters 120, one or more image sensor arrays 130, an analog-to-digital converter (ADC) 140, a digital signal processor (DSP) 150 and one or more computing device readable media 150. The image sensor 130 includes a two-dimension array of hundreds, thousand, millions or more of imaging pixels, which each convert light (e.g. photons) into electrons. The image sensor 130 may be a charge coupled device (CCD), complementary metal oxide semiconductor (CMOS) device, or the like. The filter 120 may be a Bayer filter that generates a mosaic if monochrome pixels. The mosaic of monochrome pixels are typically arranged in a pattern of red, green and blue pixels.

In an exemplary implementation, the digital camera 100 may include a lens 110 to focus light to pass through the Bayer filter 120 and onto the image sensor 130. The photons passing through each monochrome pixel of the Bayer filter 120 are sensed by a corresponding pixel sensor in the image sensor 130. The analog-to-digital converter (ADC) 140 converts the intensity of photons sensed by the pixel sensor array into corresponding digital pixel data. The raw pixel data is processed by the DSP 150 using a demosaic algorithm to produce final interpolated pixel data. The final interpolated pixel data is typically stored in one or more of the computing device readable media 160. One or more of the computing device readable media 160 may also store the raw pixel data.

Referring now to FIG. 2, an exemplary Bayer filter is shown. The Bayer filter pattern alternates rows of red and green filters 210, 220 with rows of blue and green filters 230, 240. The Bayer filter interleaves the red, green and blue color filters so that (1) each pixel only senses one color, and (2) in any 2×2 pixel cluster on the sensory plane, there are always two pixels sensing green information, one pixel for red, and one for blue. A demosaic algorithm interpolates the other two color components for each pixel from the surrounding raw pixel data. For example, if a given pixel generates a red signal, the demosaic algorithm interpolates a green and a blue color signal from the surrounding raw pixel data.

The Bayer filter/image sensor is subject to color artifacts. A color artifact happens when a scene contains a high frequency pattern that is beyond the Bayer array's Nyquist rate. Accordingly, there is a continuing need for improved imaging processing techniques to reduce color artifacts.

SUMMARY OF THE INVENTION

Embodiments of the present invention are directed toward techniques for reducing artifacts in digital images. In one embodiment, a method of demosaicing digital image data includes receiving raw pixel data for a given image. The raw pixel data is low pass filtered using a first demosiac kernel size to determine first level interpolated pixel data for each pixel. The raw pixel data is also low pass filtered using a second demosiac kernel size to determine second level interpolated pixel data for each pixel. The presence or absence of an artifact in each pixel is determined from the first level interpolated pixel data. If an artifact is not present at a given pixel, the adjusted interpolated pixel data for the given pixel is equal to the first level interpolated pixel data for the given pixel. If an artifact is determined to be present at the given pixel, the adjusted interpolated pixel data for the given pixel is equal to a blend of the first level interpolated pixel data and the second level interpolated pixel data for the given pixel. The adjusted interpolated pixel data for the image may then be output and/or stored in memory.

In another embodiment, a method includes receiving a stream of Bayer filter pixel data for a given image. Horizontal first level and second level low pass filter values for each pixel are determined utilizing a first and second kernel size respectively. Vertical first level and second level low pass filter values for each pixel are also determined utilizing the first and second kernel sizes respectively. First level interpolated pixel data for each pixel is determined from the horizontal and vertical first level low pass filter values. Second level interpolated pixel data for each pixel is likewise determined from the horizontal and vertical second level low pass filter values. The color space of the first and second level interpolated pixel data are converted to separate the chroma and luma components for each level. The chroma component of the first level interpolated pixel data is reduced as a function of the difference between the green-on-red row and green-on-blue row chroma component of the pixel data of each of the given pixels to generate adjusted interpolated pixel data.

In yet another embodiment, the method includes receiving Bayer pixel data for a given image. The Bayer pixel data is low pass filtered using a first kernel size to determine first level interpolated pixel data. The Bayer pixel data is also low pass filtered using a second kernel size to determine second level interpolated pixel data. Adjusted interpolated data for a given pixel is equal to the first level interpolated pixel data for the given pixel, if a difference between chroma components in the first level interpolated pixel data is below a specified level. The adjusted interpolated pixel data for the given pixel is equal to a blend of the first level interpolated pixel data and the second level interpolated pixel data for the given pixel, if the difference between chroma components in the first level interpolated pixel data is above the specified level and a difference between chroma components in the second level interpolated pixel data is below the specified level. The method may further include generating additional levels of chroma components by low pass filtering the Bayer pixel data using increasingly larger kernel sizes until the difference between chroma components of a next level is below the specified level. In such case, the adjusted interpolated pixel data may be set equal to a blend of the interpolated pixel data for the level at which the difference between chroma components is below the specified level and one or more previous levels.

BRIEF DESCRIPTION OF THE DRAWINGS

Embodiments of the present invention are illustrated by way of example and not by way of limitation, in the figures of the accompanying drawings and in which like reference numerals refer to similar elements and in which.

DETAILED DESCRIPTION OF THE INVENTION

Reference will now be made in detail to the embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present invention, numerous specific details are set forth in order to provide a thorough understanding of the present invention. However, it is understood that the present invention may be practiced without these specific details. In other instances, well-known methods, procedures, components, and circuits have not been described in detail as not to unnecessarily obscure aspects of the present invention.

Figure 1:
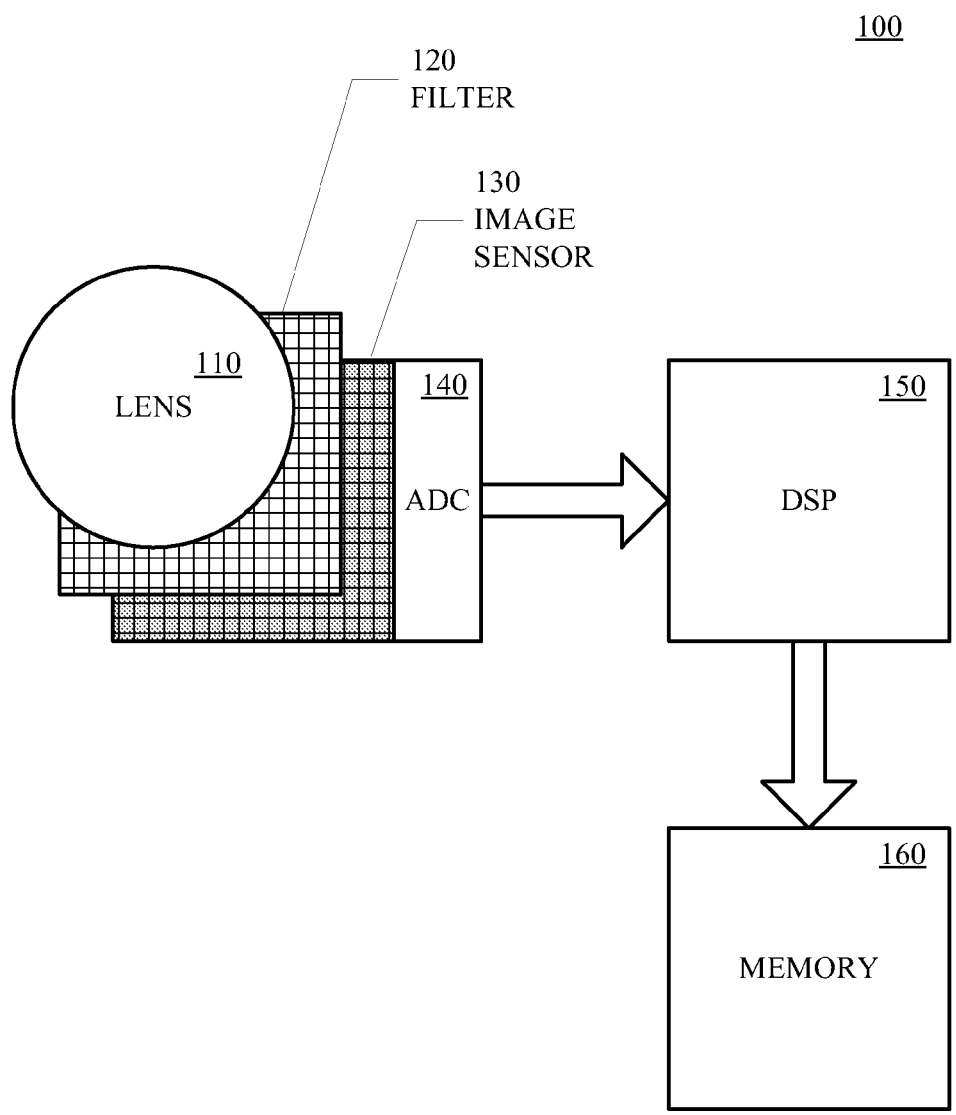
FIG. 1 shows a block diagram of an exemplary digital camera.
Figure 2:
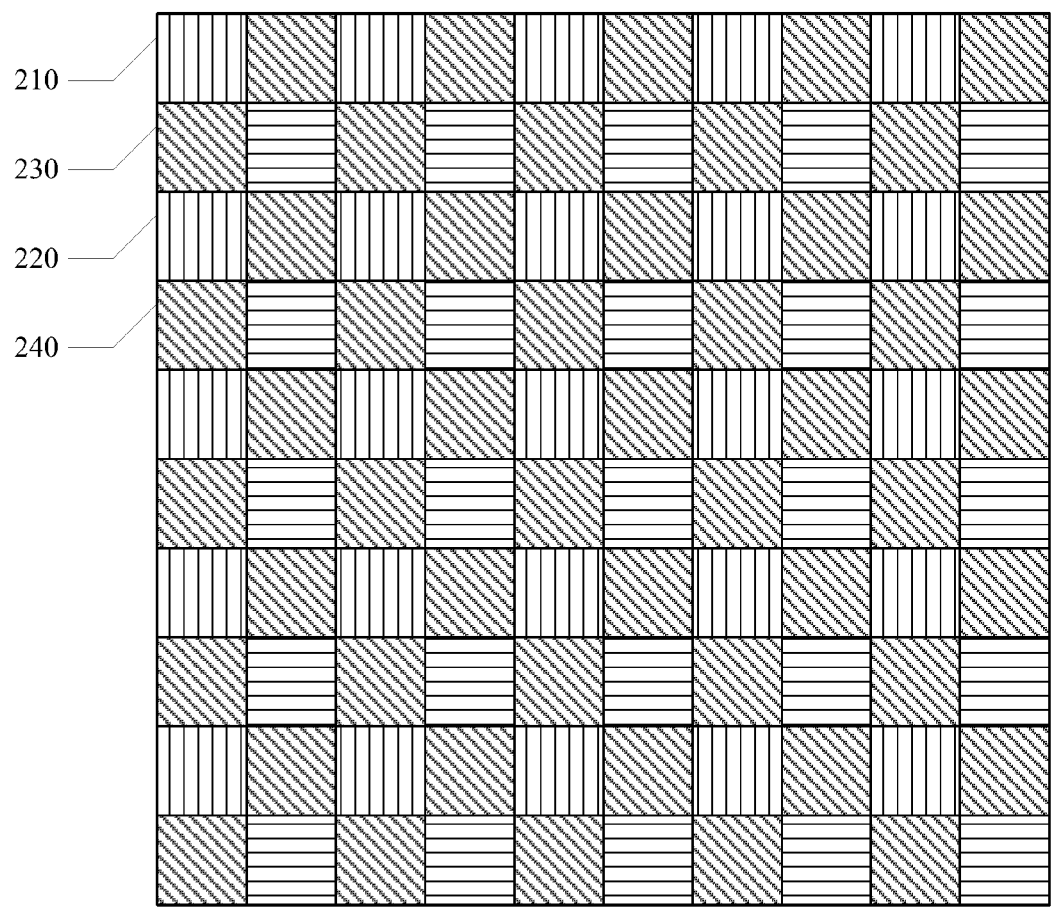
FIG. 2 shows a block diagram of an exemplary Bayer filter.
Figure 2:
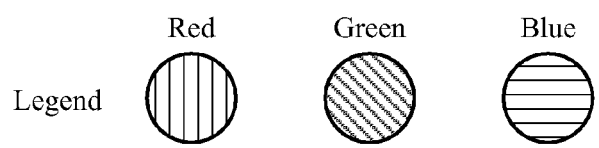
Figure 3:
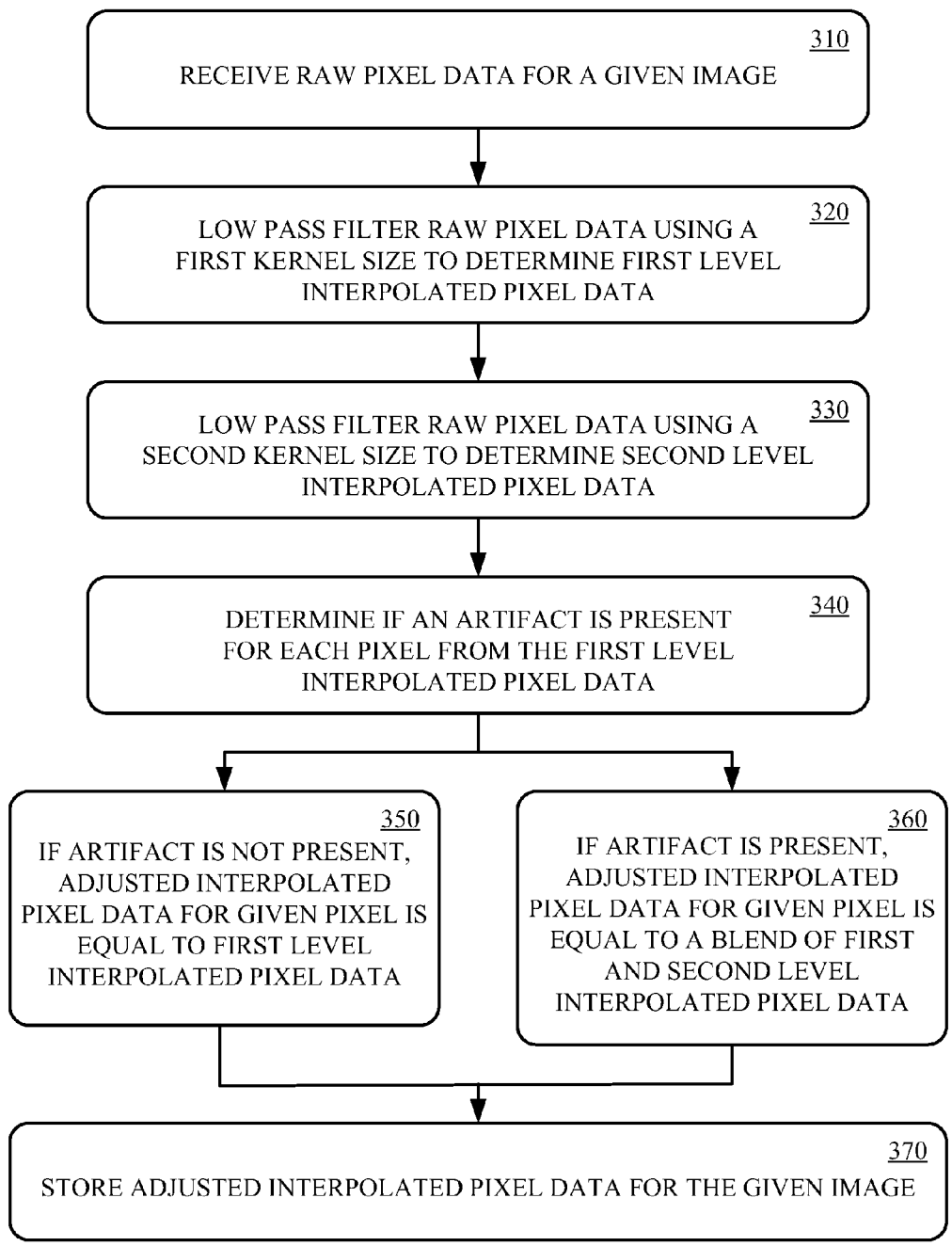
FIG. 3 shows a flow diagram of a method of demosaicing digital image data, in accordance with one embodiment of the present invention.

Referring now to FIG. 3, a method of demosaicing digital image data, in accordance with one embodiment of the present invention. The method begins with receiving raw pixel data for a given image, at 310. The raw pixel data may include red, green and blue pixel data received as a stream upon which the following processing is substantially performed as the pixels are received. At 320, the received pixel data is low pass filtered using a first demosiac kernel size to determine first level interpolated pixel data $P_{L1}$ for each pixel. The first level interpolated pixel data $P_{L1}$ includes a red (R) color value, a green-on-red row (Gr) color value, green-on-blue row (Gb) color value and a blue (B) color value. At 330, the received pixel data is also low pass filtered using a second demosiac kernel size to determine second level interpolated pixel data $P_{L2}$ for each pixel. The second level interpolated pixel data includes a red (R) color value, green-on-red row (Gr) color value, a green-on-blue row (Gb) color value and a blue (B) color value. The kernel size of the second level is larger than the kernel size of the first level. The low pass filtering at the first and second levels may be performed by averaging the pixel data in the horizontal direction and recursive filtering the pixel data in the vertical direction.

At 340, it is determined if an artifact is present for each pixel. An artifact may be detected based upon the absolute difference between the Gr and Gb signals in the first level interpolated pixel data $P_{L1}$. If in a local region the Gr signal is substantially different from the Gb signal strength, it is likely that the scene frequency is beyond the Nyquist rate of blue and red. Therefore, a color artifact is detected when the Gr signal strength is substantially different from the Gb signal strength.

At 350, if a color artifact is not detected, the adjusted interpolated pixel data for the given pixel is set equal to the first level interpolated pixel data for the given pixel. In particular, the chroma component of the interpolated pixel data for the given pixel will be the first level chroma component. At 360, if a color artifact is detected, the adjusted interpolated pixel data for the given pixel is set equal to a blend of the first level interpolated pixel data and the second level interpolated pixel data for the given pixel. In particular, the chroma component of the interpolated pixel data for the given pixel will be generated by blending the first level chroma component with the second level chroma component. The blending ratio between the first and second level chroma components may be based upon the difference between the Gr and Gb signals. The adjusted interpolated pixel data may be further processed according to one or more other digital image processing techniques or it may be the final interpolated pixel data. At 370, the adjusted interpolated pixel is stored in a computing device readable medium.

Figure 4:
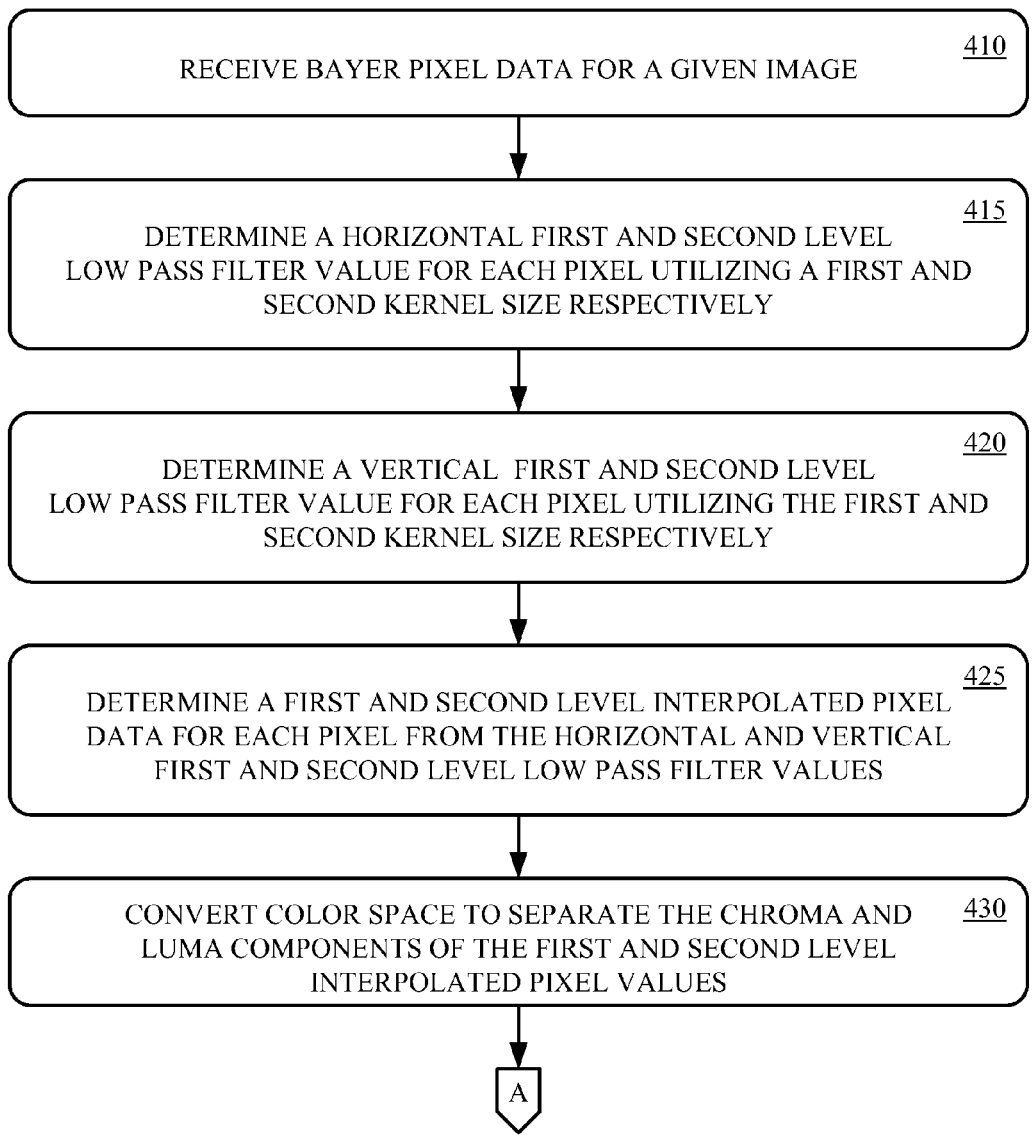
FIGS. 4 and 5 show a flow diagram of a method of demosaicing digital image data, in accordance with another embodiment of the present invention.
Figure 5:
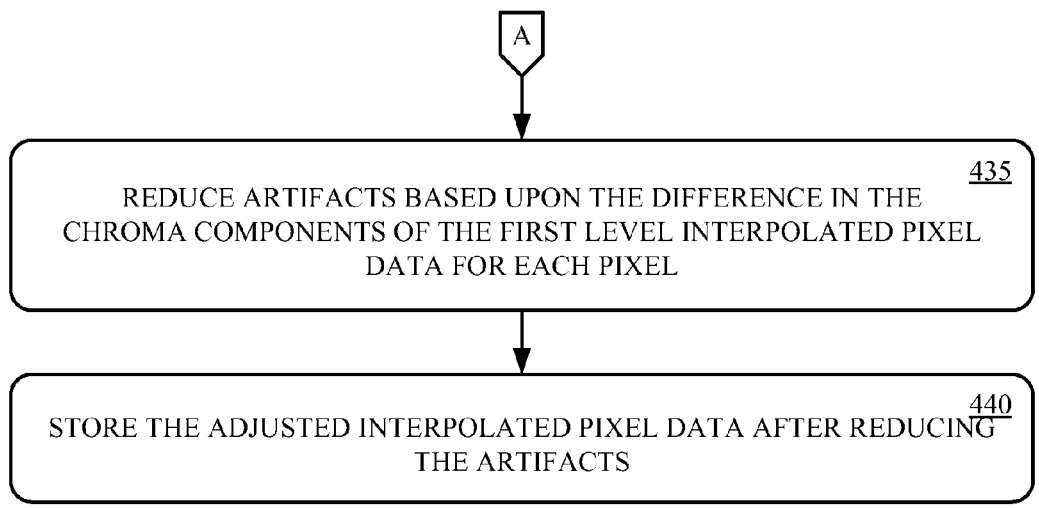
Figure 6:
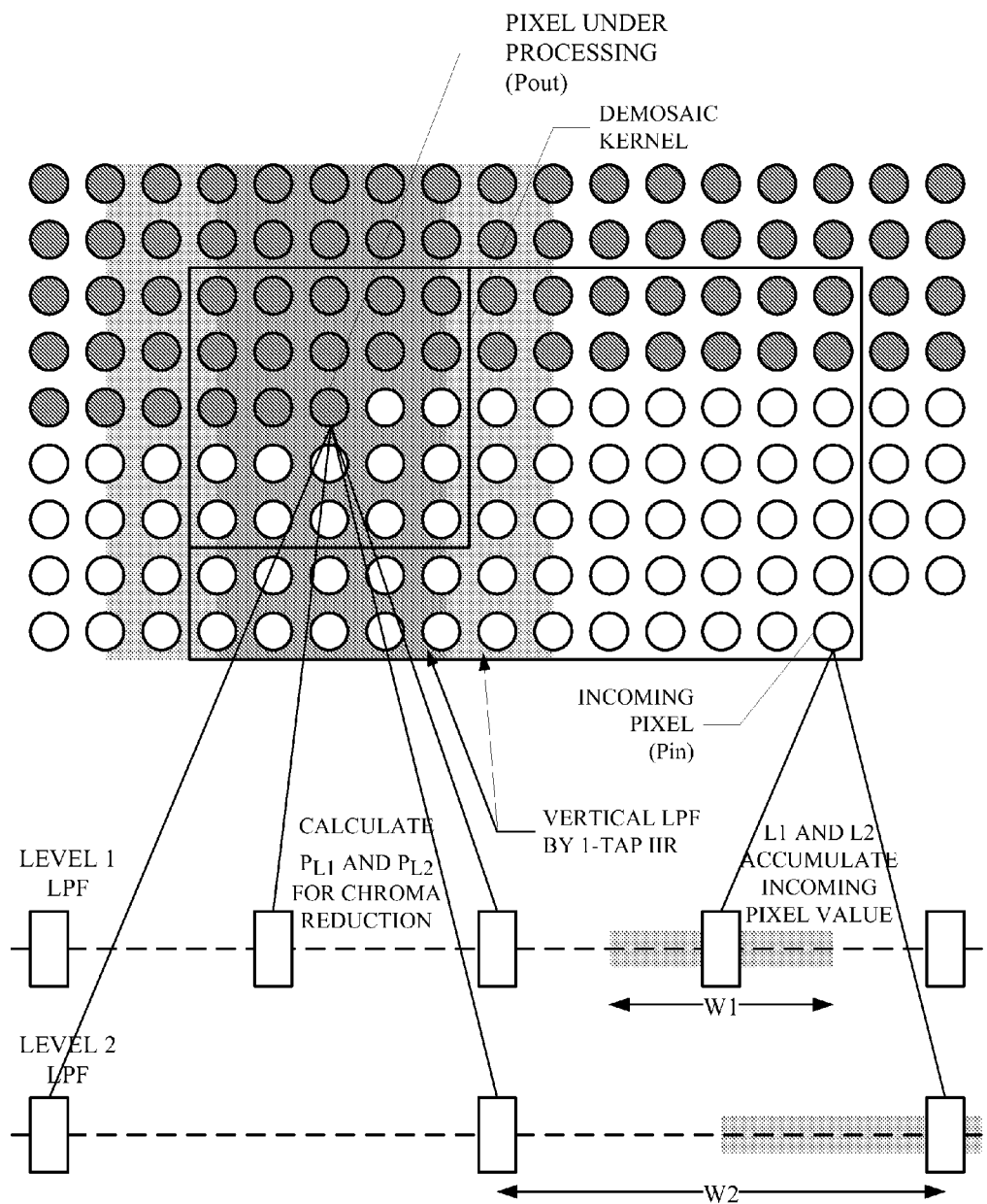
FIG. 6 shows a block diagram of processing an exemplary array of pixels, in accordance with one embodiment of the present invention.

Referring now to FIGS. 4 and 5, a method of demosaicing digital image data, in accordance with another embodiment of the present invention, is shown. The method of demosaicing digital image data will be further described with reference to FIG. 6, which illustrates the processing of an exemplary array of pixels. The method begins with receiving a stream of Bayer filter pixel data for a given image, at 410. At 415, a horizontal first and second level low pass filter value for each pixel is determined utilizing a first kernel size (W1) and a second kernel size (W2) respectively. If the incoming image width is W, the number of elements in the first level low pass filter will be W/W1 and the number of elements in the second level low pass filter will be W/W2. The kernel size W2 in the second level is greater than the kernel size W1 in the first level. In one implementation, W1 and W2 may be powers of 2. When the incoming pixel is received, the pixel value may be accumulated for level one (L1) and level two (L2) respectively, as illustrated in equations 1 and 2.

$$\text{Accum}_{L1} \mathrel{+}= P\text{in} \tag{1}$$

$$\text{Accum}_{L2} \mathrel{+}= P\text{in} \tag{2}$$

When W1 pixels are accumulated, the sum is averaged and sent to the L1 row for vertical low pass filtering, as illustrated in equation 3. Similarly, when W2 pixels are accumulated, the sum is averaged and sent to the L2 row for low pass filtering, as illustrated in equation 4.

$$\text{If}(\text{Accum}_{L1}=\text{full}) \text{ Accum}_{L1} \mathrel{/}= W1 \tag{3}$$

$$\text{If}(\text{Accum}_{L2}=\text{full}) \text{ Accum}_{L2} \mathrel{/}= W2 \tag{4}$$

If W1 and W2 are powers of 2, the averaging may be implemented by right shifting.

At 420, a vertical first and second level low pass filter value for each pixel is determined. In one implementation, the low pass filtering in the vertical direction can be done by recursive filtering, such as a one-tap infinite impulse response (1-tap IIR) filter. When horizontal averaging for a local W1 and W2 pixel group is done, the average value will be updated to the corresponding element in the L1 and L2 row, as illustrated in equations 5 and 6.

$$L1[i] \mathrel{+}= (\text{Accum}_{L1} - L1[1])/K_{L1} \tag{5}$$

$$L2[j] \mathrel{+}= (\text{Accum}_{L2} - L2[j])/K_{L2} \tag{6}$$

$K_{L1}$ and $K_{L2}$, in equations 5 and 6, are IIR filter coefficients. If $K_{L1}$ and $K_{L2}$ are power of 2 the division can be implemented by right shifting.

At 425, first and second level interpolated pixel data for each pixel is generated. The low passed first and second level pixel values ($P_{L1}$, $P_{L2}$) of the demosaic output Pout may be generated by linear interpolation. For instance, suppose X is the horizontal coordinate of Pout, and m=floor(X/W1) and n=floor (X/W2) then $P_{L1}$ and $P_{L2}$ can be generated as illustrated in equations 7 and 8.

$$P_{L1}=f1*L1[m]+(1-f1)*L1[m+1] \quad (7)$$

$$P_{L2}=f2*L2[n]+(1-f2)*L2[n+1] \quad (8)$$

Wherein f1=1−(X−m*W1)/W1 and f2=1−(X−n*W2)/W2.

At 430, the color space of the interpolated pixel data is converted to separate it into luma and chroma components. The objective of color artifact reduction is to replace the chroma components of Pout by $P_{L1}$, or $P_{L2}$ or the combination of the $P_{L1}$ and $P_{L2}$. For that a color conversion is performed to separate the luma and chroma components of the RGB color (Pout, $P_{L1}$ and $P_{L2}$), as illustrated in equations 9, 10, 11, 12, 13 and 14.

$$Y=(R+(G*2)+B)/4 \quad (9)$$

$$U=B-Y \quad (10)$$

$$V=R-Y \quad (11)$$

The inverse transform is:

$$R=Y+V \quad (12)$$

$$G=Y-(U+V)/2 \quad (13)$$

$$B=Y+U \quad (14)$$

Wherein Y is the luma component and U and V are the chroma components.

At 435, the color artifacts are reduced based upon how large the difference is between the green-on-red (Gr) and green-on-blue (Gb) components, as illustrated in equations 15, 16, 17 and 18.

$$fL1=|Pout(Gr)-Pout(Gb)|/2^p \quad (15)$$

$$fL2=|PL1(Gr)-PL1(Gb)|/2^p \quad (16)$$

$$U\text{adjusted}=(1-fL1)*Pout(U)+fL1*((1-fL2)*PL1(U)+fL2*PL2(U)) \quad (17)$$

$$V\text{adjusted}=(1-fL1)*Pout(V)+fL1*((1-fL2)*PL1(V)+fL2*PL2(V)) \quad (18)$$

If Gr and Gb is large, the adjusted U and V will be close to the blending of L1 and L2 chroma components. The blending is also weighted by the Gr–Gb difference. In particular, if the Gr and Gb components at L1 is close, then the influence from L2 will be small. A few control parameters can also be used to adjust the weightings of the chroma blending, as illustrated in equations 19 and 20.

$$f'=f-\text{Coring} \quad (19)$$

If f'<0 f'=0

$$f''=f'*\text{Weighting} \quad (20)$$

fL1 and fL2 can have separate sets of {Coring, Weighting} parameters.

At 440, the adjusted interpolated pixel data is stored in one or more computing device readable media. The adjusted interpolated pixel data stored in the computing device readable media may be output for present to a user or may be further processed according to one or more other digital imaging techniques.

Figure 7:
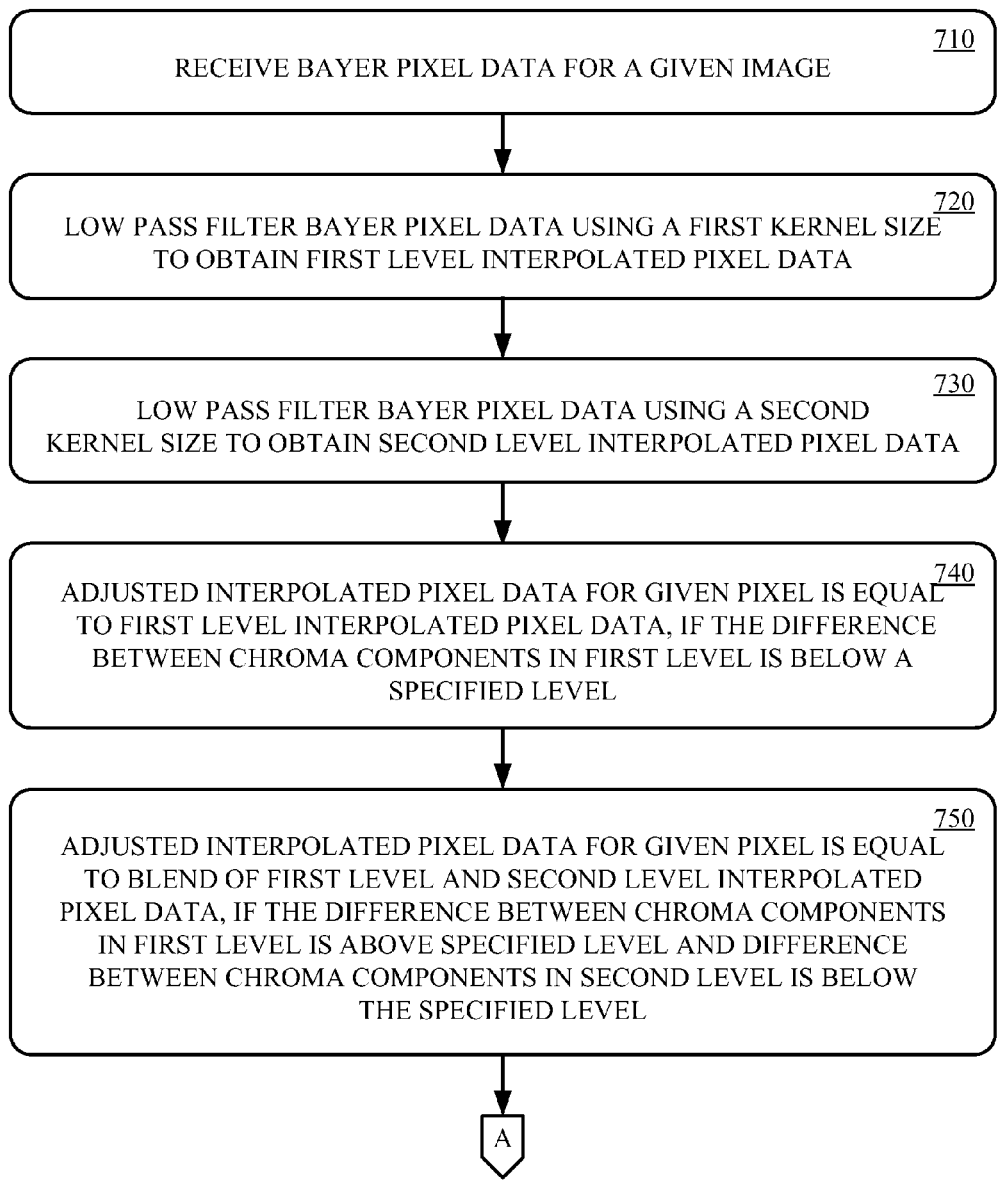
FIGS. 7 and 8 show a flow diagram of a method of demosaicing digital image data, in accordance with another embodiment of the present invention.
Figure 8:
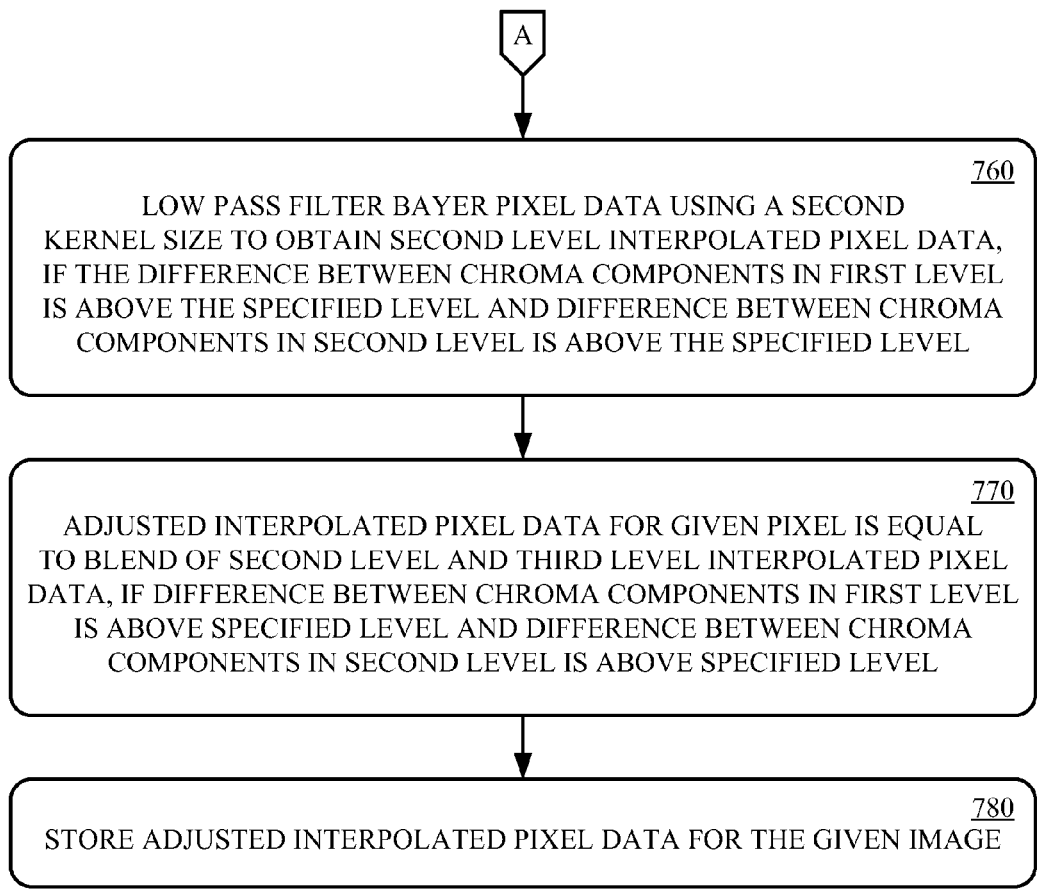

Referring now to FIGS. 7 and 8, a method of demosaicing digital image data, in accordance with another embodiment of the present invention, is shown. The method begins with receiving Bayer pixel data for a given image, at 710. The Bayer pixel data may be received as a stream or red, green and blue pixel data upon which the following processing is substantially performed on the fly as the pixels are received. At 720, the Bayer pixel data is low pass filtered using a first demosiac kernel size to determine first level interpolated pixel data $P_{L1}$ for each pixel. The first level interpolated pixel data include a red (R) color signal, a green-on-red row (Gr) color signal, a green-on-blue row (Gb) color signal and a blue (B) color signal. At 730, the received pixel data is also low pass filtered using a second demosiac kernel size to determine second level interpolated pixel data $P_{L2}$ for each pixel. The second level interpolated pixel data include a red (R) color signal, a green-on-red row (Gr) color signal, a green-on-blue row (Gb) color signal and a blue (B) color signal. The kernel size of the second level is larger than the kernel size of the first level.

At 740, if the difference between the Gr and Gb signals of the first level interpolated pixel data is below a specified level, the chroma component of the adjusted interpolated pixel data for the given pixel is set to the first level chroma component. At 750, if the difference between the Gr and Gb signals of the first level interpolated pixel data is above the specified level and the difference between the Gr and Gb signals of the second level is below the specified level, the chroma component of the adjusted interpolated pixel data for the given pixel is generated by blending the first level chroma component with the second level chroma component. The blending ratio between the first and second level chroma components may be based upon the difference between the Gr and Gb signals of the first level.

At 760, if the difference between the Gr and Gb signals of the first and second level interpolated pixel data are above the specified level, the received pixel data is low pass filtered using a third demosiac kernel size to determine a third level interpolated pixel data $P_{L2}$ for the given pixel. The kernel size of the third level is larger than the kernel size of the second level. At 770, if the difference between the Gr and Gb signals of the first and second level low pass filter values are above the specified level, the chroma component of the adjusted interpolated pixel data for the given pixel is generated by blending the second level chroma component with the third level chroma component. The blending ratio between the second and third level chroma components may be based upon the difference between the Gr and Gb signals in the second level. In another implementation, the chroma component of the final interpolated pixel data for the given pixel is generated by blending the first, second and third level chroma components, if the difference between the Gr and Gb signals of the first and second level interpolated pixel data are above the specified level. In yet another implementation, additional levels of chroma components can be generated by low pass filtering using increasingly larger kernel sizes until the difference between the Gr and Gb signals of a given level is above the specified level and the Gr and Gb signal of a next level is below the specified level. In such an implementation, the chroma component of the adjusted interpolated pixel data for a particular pixel may be generated by blending the chroma component from the next level with one or more of the previous levels. At 780, the adjusted interpolated pixel data is stored in a computing device readable medium.

The above described techniques for reducing artifacts in digital images may be implemented by the digital signal processor of a digital camera or by a separate computing device. The above described techniques may be embodied in computing device executable instructions (software), hardware and/or firmware. The techniques advantageously reduce false colors while reducing color bleaching. In addition, the above described techniques do not result in excessive line buffering.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of demosaicing digital image data comprising:
   receiving raw pixel data for a given image;
   low pass filtering the raw pixel data using a first demosiac kernel size to determine first level interpolated pixel data for each pixel;
   low pass filtering the raw pixel data using a second demosiac kernel size to determine second level interpolated pixel data for each pixel;
   determining if an artifact is present for each pixel from the first level interpolated pixel data;
   if the artifact is not present at a given pixel, setting adjusted interpolated pixel data for the given pixel equal to the first level interpolated pixel data for the given pixel;
   if the artifact is present at the given pixel, setting the adjusted interpolated pixel data for the given pixel equal to a blend of the first level interpolated pixel data and the second level interpolated pixel data for the given pixel; and
   storing the adjusted interpolated pixel data in a computing device readable medium.

2. The method according to claim 1, wherein the raw pixel data comprises Bayer pixel data.

3. The method according to claim 2, wherein:
   the first level interpolated pixel data for each pixel comprise a red (R) color value, a green-on-red row (Gr) color value, green-on-blue row (Gb) color value and a blue (B) color value; and
   the second level interpolated pixel data for each pixel comprise a red (R) color value, a green-on-red row (Gr) color value, a green-on-blue row (Gb) color value and a blue (B) color value.

4. The method according to claim 3, wherein the demosaic kernel size of the second level is larger than the demosaic kernel size of the first level.

5. The method according to claim 4, wherein determining if a color artifact is present comprises determining the absolute difference between the green-on-red row (Gr) color value and green-on-blue row (Gb) color value in the first level interpolated pixel data.

6. The method according to claim 5, wherein a color artifact is present if the green-on-red row (Gr) color value is substantially different from the green-on-blue row (Gb) color value.

7. The method according to claim 6, wherein the blending ratio between the first and second level interpolated pixel data is a function of the difference between the green-on-red row (Gr) color value and green-on-blue row (Gb) color value.

8. One or more non-transitory computing device readable media containing a plurality of instructions which when executed cause a computing device to implement a method comprising:
   receiving a stream of Bayer filter pixel data for a given image;
   interpolating red, green-on-red row, green-on-blue row and blue pixel data from the Bayer filter pixel data for each pixel of the given image for two different kernel sizes;
   reducing an artifact in one or more given pixels as a function of a difference between the green-on-red row and green-on-blue row pixel data of each of the given pixels of the two different kernel sizes to generate adjusted interpolated pixel data equal to interpolated pixel data of one of the kernel sizes if the artifact is not present and equal to a blend of the interpolated pixel data for the two different kernel sizes if the artifact is present; and
   storing the adjusted interpolated pixel data.

9. The one or more non-transitory computing device readable media containing a plurality of instruction which when executed cause a computing device to implement the method according to claim 8, wherein interpolating red, green-on-red row, green-on-blue row and blue pixel data further comprises:
   determining a horizontal first level low pass filter value for each pixel utilizing a first kernel size;
   determining a horizontal second level low pass filter value for each pixel utilizing a second kernel size;
   determining a vertical first level low pass filter value for each pixel utilizing the first kernel size;
   determining a vertical second level low pass filter value for each pixel utilizing the second kernel size;
   determining first level interpolated pixel data for each pixel from the horizontal first level low pass filter value and the vertical first level low pass filter value;
   determining second level interpolated pixel data for each pixel from the horizontal second level low pass filter value and the vertical second level low pass filter value;
   converting a color space of the first level interpolated pixel data to separate chroma and luma components; and
   converting the color space of the second level interpolated pixel data to separate the chroma and luma components.

10. The one or more non-transitory computing device readable media containing a plurality of instruction which when executed cause a computing device to implement the method according to claim 9, wherein:
    determining the horizontal first level low pass filter value for each given pixel comprises averaging the pixels for each corresponding set of adjacent pixels of the first kernel size; and
    determining the horizontal second level low pass filter value for each given pixel comprises averaging the pixels for each corresponding set of adjacent pixels of the second kernel size.

11. The one or more non-transitory computing device readable media containing a plurality of instruction which when executed cause a computing device to implement the method according to claim 9, wherein:
    determining the vertical first level low pass filter value for each given pixel comprise regressive filtering the pixels for each corresponding set of adjacent pixels of the first kernel size; and
    determining the vertical second level low pass filter value for each given pixel comprises regressive filtering the pixels for each corresponding set of adjacent pixels of the second kernel size.

12. The one or more non-transitory computing device readable media containing a plurality of instruction which when executed cause a computing device to implement the method according to claim 9, wherein reducing the artifact in one or more given pixels further comprises:

reducing the chroma component of the first level interpolated pixel data as the function of a difference between the green-on-red row and green-on-blue row chroma components of the pixel data of each of the given pixels to generate adjusted interpolated pixel data.

13. The one or more non-transitory computing device readable media containing a plurality of instruction which when executed cause a computing device to implement the method according to claim 12, further comprising adjusting a weighting of the chroma blending to generate the adjusted interpolated pixel data utilizing a coring parameter.

14. The one or more non-transitory computing device readable media containing a plurality of instruction which when executed cause a computing device to implement the method according to claim 12, further comprising: adjusting the weightings of a chroma blending to generate the adjusted interpolated pixel data utilizing a weightings parameter.

15. The one or more non-transitory computing device readable media containing a plurality of instruction which when executed cause a computing device to implement the method according to claim 10, wherein:

the kernel size of the first level is a power of two; and
the kernel size of the second level is a power of two and greater then the kernel size of the first level.

16. One or more non-transitory computing device readable media containing a plurality of instructions which when executed cause a computing device to implement a method comprising:

receiving Bayer pixel data for a given image;
low pass filtering the Bayer pixel data using a first kernel size to determine first level interpolated pixel data;
low pass filtering the Bayer pixel data using a second kernel size to determine second level interpolated pixel data;
setting an adjusted interpolated pixel data equal to the first level interpolated pixel data for a given pixel, if a difference between chroma components in the first level interpolated pixel data is below a specified level;
setting the adjusted interpolated pixel data to a blend of the first level interpolated pixel data and the second level interpolated pixel data for a given pixel, if the difference between chroma components in the first level interpolated pixel data is above the specified level and a difference between chroma components in the second level interpolated pixel data is below the specified level; and
outputting the adjusted interpolated pixel data.

17. The one or more non-transitory computing device readable media containing a plurality of instruction which when executed cause a computing device to implement the method according to claim 16, further comprising:

low pass filtering the Bayer pixel data using a third kernel size to determine third level interpolated pixel data; and
setting the adjusted interpolated pixel data to a blend of the second level interpolated pixel data and the third level interpolated pixel data for a given pixel, if the difference between chroma components in the first level interpolated pixel data is above the specified level and a difference between chroma components in the second level interpolated pixel data is below the specified level.

18. The one or more non-transitory computing device readable media containing a plurality of instruction which when executed cause a computing device to implement the method according to claim 17, wherein:

a blending ratio between the first and second level interpolated pixel data is a function of the difference between a green-on-red row (Gr) color value and a green-on-blue row (Gb) chroma value of the first level interpolated pixel data; and
a blending ratio between the second and third level interpolated pixel data is a function of a difference between the green-on-red row (Gr) color value and green-on-blue row (Gb) chroma value of the second level interpolated pixel data.

19. The one or more non-transitory computing device readable media containing a plurality of instruction which when executed cause a computing device to implement the method according to claim 16, further comprising:

generating additional levels of chroma components by low pass filtering the Bayer pixel data using increasingly larger kernel sizes until a difference between the green-on-red row (Gr) color value and green-on-blue row (Gb) chroma value of a given level is below the specified level; and
generating the chroma component of the adjusted interpolated pixel data by blending the chroma component from the given level with one or more previous levels of the interpolated pixel data.

\* \* \* \* \*